Patented Apr. 27, 1954

2,676,970

UNITED STATES PATENT OFFICE 2,676,970

BENZOTHIAZOLE DERIVATIVES

Norbert Steiger, Nutley, and Oscar Keller, Clifton, N. J., assignors to Hoffmann-La Roche Inc., Nutley, N. J., a corporation of New Jersey No Drawing. Application January 30, 1952, Serial No. 269,123

9 Claims. (Cl. 260—305)

This invention relates to 2-(1-pyrrolidyl)-6-($\beta$-diethylaminoethoxy)benzothiazole and the process for its manufacture. The invention also embraces the acid addition salts of the aforesaid compound, and novel intermediates employed in its production. The 2-(1-pyrrolidyl)-6-($\beta$-diethylaminoethoxy)benzothiazole and its salts are useful as antifungal agents, for example, against the fungi *T. Mentagrophytes* and *M. Felineum*.

The 2-(1-pyrrolidyl)-6-($\beta$-diethylaminoethoxy)benzothiazole can be prepared by reacting 2-(1-pyrrolidyl)-6-hydroxy-benzothiazole in the form of its alkali metal salt, e. g. sodium, potassium, or lithium salt, with 1-diethylamino-2-chloro-ethane. The reaction is preferably carried out in the presence of an organic solvent or diluent, e. g. chlorbenzene, toluene, xylene, and the like. The 2-(1-pyrrolidyl)-6-($\beta$-diethylaminoethoxy)benzothiazole can be recovered from the reaction medium as the free base by removing the organic solvents; or as the acid addition salts thereof, e. g. as the hydrochloride or hydrobromide, by passing hydrogen chloride or hydrogen bromide into the reaction medium. The free base readily yields acid addition salts with both organic and inorganic acids. Thus, by treating the free base with an equivalent amount of acid, as, for example, hydrochloric, hydrobromic, sulfuric, phosphoric, nitric, acetic, propionic, caprylic, undecylenic, tartaric, and citric acids, the corresponding acid addition salts can be obtained.

The 2-(1-pyrrolidyl)-6-hydroxy-benzothiazole employed as the starting material can be readily prepared from 2-(1-pyrrolidyl)-6-ethoxy-benzothiazole by hydrolysis of the latter with alminum chloride in a suitable solvent, such as chlorobenzene. The 2-(1-pyrrolidyl)-6-ethoxy-benzothiazole can, in turn, be prepared by reacting a 6-ethoxy-benzothiazole-2-sodium sulfonate with pyrrolidine in the presence of zinc chloride.

The preparation of the intermediates is illustrated by the following examples:

EXAMPLE A

*2-(1-pyrrolidyl)-6-ethoxy-benzothiazole*

56 grams (0.2 mole) of 6-ethoxy-benzothiazole-2-sodium sulfonate and 25 grams (0.35 mole) of pyrrolidine in 200 cc. of water, and 10 grams of zinc chloride were heated at 125° C. for 8 hours in a nitrogen atmosphere at 150 lbs. per square inch. The reaction mixture was diluted with ice water, and the resulting precipitate was filtered and sucked dry. Upon crystallization of the precipitate from ethanol, 2-(1-pyrrolidyl)-6-ethoxy-benzothiazole, M. P. 128-130° C., was obtained.

EXAMPLE B

*2-(1-pyrrolidyl)-6-hydroxy-benzothiazole*

27.5 grams of 2-(1-pyrrolidyl)-6-ethoxy-benzothiazole were mixed with 200 cc. of chlorobenzene. 35 grams of anhydrous aluminum chloride were added, and the mixture was heated to 132° C. for 3 hours. It was then cooled at 20° C. and 100 grams of ice and 15 cc. of hydrogen chloride were added. The reaction mixture was steam distilled to remove the chlorobenzene, and to the residue were added 100 grams of sodium chloride. The mixture was then filtered at 10° C. The filter cake was mixed with 500 cc. of water and 25 grams of sodium acetate and heated to 60° C. for 1 hour. The mixture was then filtered at 20° C. and washed with ice water. The 2-(1-pyrrolidyl)-6-hydroxy-benzothiazole thus obtained melted at 278-280° C.

The method of preparing the 2-(1-pyrrolidyl)-6-($\beta$-diethylaminoethoxy)benzothiazole is illustrated by the following example:

Example 23 grams of 2-(1-pyrrolidyl)-6-hydroxy-benzothiazole, 200 cc. of chlorobenzene, 4.5 grams of sodium hydroxide flakes, and 6 cc. of water were heated together to 130° C. and the heating continued into all the water had boiled off. The reaction mixture was then cooled to 60° C., 18 grams of 1-diethylamino-2-chloroethane were added, and the mixture then heated to 132° C. for 5 hours. The reaction mixture was permitted to cool to 90° C., then 60 cc. of water were added, and the mixture heated to 60–70° C. for ½ hour. The chlorobenzene layer which contained the reaction product was separated from the aqueous layer in a separatory funnel. The chlorobenzene solution was then concentrated in vacuo. To the residue, 2-(1-pyrrolidyl)-6-($\beta$-diethylaminoethoxy)benzothiazole, were added 25 cc. of methanol and 30 cc. of methanol-hydrogen chloride (30%). The methanol was distilled off in vacuo and the solid residue was crystallized from ethanol-acetone. The 2-(1-pyrrolidyl)-6-($\beta$-diethylaminoethoxy)benzothiazole dihydrochloride was thus obtained in the form of white crystals, M. P. 238-239° C.

A solution of 4 grams of 2-(1-pyrrolidyl)-6-($\beta$-diethylaminoethoxy)benzothiazole dihydrochloride in 50 cc. of water was made alkaline by adding a 20% aqueous solution of sodium carbonate. On cooling the solution, crystals of 2-(1-pyrrolidyl)-6-($\beta$-diethylaminoethoxy)benzothiazole formed and were filtered off. The free base melted at 47° C.

1.6 grams of 2-(1-pyrrolidyl)-6-(β-diethylaminoethoxy)benzothiazole and 1.07 grams of citric acid were dissolved at the boil in 10 cc. of ethanol. On cooling the solution, 2-(1-pyrrolidyl)-6-(β-diethylaminoethoxy)benzothiazole citrate crystallized in the form of white crystals, M. P. 156° C. The compound is soluble in water.

3.19 grams of 2-(1-pyrrolidyl)-6-(β-diethylaminoethoxy)benzothiazole were dissolved in 300 cc. of ethanol. To the solution there were added dropwise 9.8 grams of 100% sulfuric acid. On cooling, 2-(1-pyrrolidyl)-6-(β-diethylaminoethoxy)benzothiazole sulfate crystallized from the solution in the form of white crystals which are soluble in water.

We claim:

1. A compound selected from the group consisting of 2-(1-pyrrolidyl)-6-(β-diethylaminoethoxy)benzothiazole and the acid addition salts thereof.

2. 2-(1-pyrrolidyl)-6-(β-diethylaminoethoxy)-benzothiazole.

3. 2-(1-pyrrolidyl)-6-(β-diethylaminoethoxy)-benzothiazole dihydrochloride.

4. 2-(1-pyrrolidyl)-6-(β-diethylaminoethoxy)-benzothiazole citrate.

5. 2-(1-pyrrolidyl)-6-(β-diethylaminoethoxy)-benzothiazole sulfate.

6. A process of preparing 2-(1-pyrrolidyl)-6-(β-diethylaminoethoxy)benzothiazole, which comprises reacting 6-ethoxy-benzothiazole-2-sodium sulfonate with pyrrolidine so as to form 2-(1-pyrrolidyl)-6-ethoxy-benzothiazole, hydrolyzing the latter compound to form 2-(1-pyrrolidyl)-6-hydroxy-benzothiazole, and reacting the latter, in the form of its alkali metal salt, with 1-diethylamino-2-chloro-ethane.

7. A process which comprises reacting 2-(1-pyrrolidyl)-6-hydroxy-benzothiazole in the form of its alkali metal salt with 1-diethylamino-2-chloroethane so as to produce 2-(1-pyrrolidyl)-6-(β-diethylaminoethoxy)benzothiazole.

8. 2-(1-pyrrolidyl)-6-ethoxy-benzothiazole.

9. 2-(1-pyrrolidyl)-6-hydroxy-benzothiazole.

References Cited in the file of this patent

UNITED STATES PATENTS

| Number | Name | Date |
| --- | --- | --- |
| 2,578,757 | Steiger et al. | Dec. 18, 1951 |